J. W. DE CAMP.
SAFETY NUT LOCK.
APPLICATION FILED MAY 6, 1915.
1,158,454.
Patented Nov. 2, 1915.
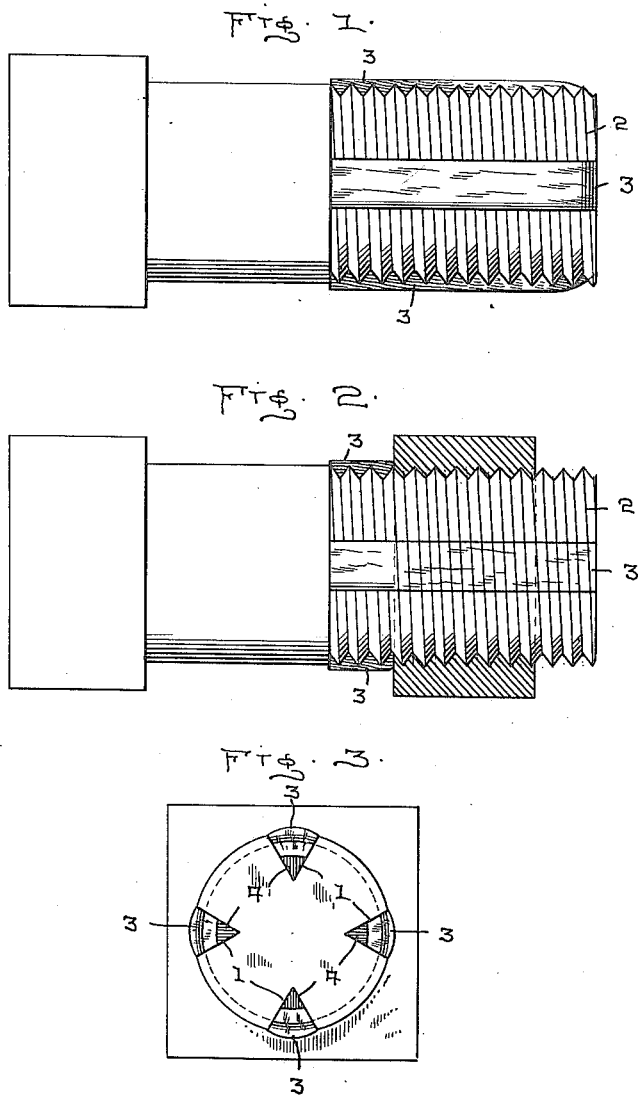

UNITED STATES PATENT OFFICE.

JOSEPH W. DE CAMP, OF ELKHORN, MONTANA.

SAFETY NUT-LOCK.

1,158,454.  Specification of Letters Patent.  Patented Nov. 2, 1915.

Application filed May 6, 1915. Serial No. 26,248.

*To all whom it may concern:*

Be it known that I, JOSEPH W. DE CAMP, a citizen of the United States, residing at Elkhorn, in the county of Jefferson and State of Montana, have invented certain new and useful Improvements in Safety Nut-Locks; and I do hereby declare the following to be a full, clear, and exact description of the invention, such as will enable others skilled in the art to which it appertains to make and use the same.

My invention relates to nut locks of the type having a locking material introduced between the bolt and the nut.

My object is to provide a means that will prevent the nut on a bolt from becoming casually loosened, even in positions where they are subject to continual vibration.

In the drawing herewith which is made a part of this application Figure 1 is a side elevation of a bolt with the locking wedges in place, Fig. 2 is a similar view showing a nut in section partly turned on the bolt, Fig. 3 is an end view of a bolt showing the manner of placing the locking wedges.

To provide a seat for the locking wedges a plurality of V-shaped grooves 1 are cut longitudinally in the threaded part of the bolt, extending the full length of the threaded portion 2.

The locking wedges 3 may be formed of any material that may be readily compressed and will again expand if the pressure is reduced, preferably of wood which may be tipped with rubber 4 on the inner edge if desired. The wedge is designed to fill the V-shaped groove of the bolt and to project slightly beyond the surface of the threads when placed in the groove. The upper surface, it being the base of the triangle of the cross section of the locking wedge, is made slightly convex. One end of the locking wedge is made slightly thicker than the other by increasing the distance from the inner angle of the triangle to the convex surface thereof, and when placing the locking wedges in the grooves of the bolt the thicker end of the wedge is placed at the inner end of the threaded portion of the bolt. This construction of the wedge makes it easy to start the nut on the bolt and as it progresses the resistance of the wedge becomes greater.

It is a well known fact that the casual loosening of nuts upon bolts is occasioned by the friction of the one upon the other which causes the thread on each to become worn and as they wear the space between them becomes larger and consequently the nut becomes loose upon the bolt. By using a material that will expand as the pressure becomes less *i. e.* as the threads are worn down, I take up the space between the nut and bolt through the expanding of the material in the wedges and thus hold the nuts firmly in place as originally placed without the use of keys or auxiliary nuts.

When using my locking device the nuts can be run on or off of the bolts as readily as though no locking means was in use. The bolts can be cut off if desired without affecting the purpose of my locking wedges.

Believing that the construction, advantages and manner of using my invention have thus been made clearly apparent, further description is deemed unnecessary.

Having thus fully described my invention, what I claim as new and desire to secure by Letters-Patent, is:

1. In combination with a bolt having a plurality of V-shaped, longitudinal grooves throughout the length of the threaded portion thereof, of a nut lock comprising a strip of wood wedge shaped in cross-section, the upper surface thereof being convex and one end slightly larger than the other.

2. In combination with a bolt having a plurality of V-shaped, longitudinal grooves throughout the length of the threaded portion thereof, of a nut lock comprising a strip of wood, combined with a strip of rubber, wedge-shaped in cross section, the upper surface of wood being convex and one end slightly larger than the other.

In testimony whereof I have signed my name to this specification in the presence of two subscribing witnesses.

JOSEPH W. DE CAMP.

Witnesses:
W. B. HUNDLEY,
H. R. HOUGHTON.